United States Patent
Vágujhelyi et al.

(10) Patent No.: US 11,741,242 B2
(45) Date of Patent: *Aug. 29, 2023

(54) CRYPTOGRAPHIC PSEUDONYM MAPPING METHOD, COMPUTER SYSTEM COMPUTER PROGRAM AND COMPUTER-READABLE MEDIUM

(71) Applicant: Xtendr Zrt., Budapest (HU)

(72) Inventors: Ferenc Vágujhelyi, Budapest (HU); Gergely Vágujhelyi, Budapest (HU)

(73) Assignee: Xtendr Zrt., Budapest (HU)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,328

(22) Filed: Sep. 1, 2022

(65) Prior Publication Data
US 2022/0414236 A1  Dec. 29, 2022

Related U.S. Application Data

(63) Continuation of application No. 17/627,762, filed as application No. PCT/HU2020/050032 on Jul. 14, 2020.

(30) Foreign Application Priority Data

Jul. 15, 2019  (HU) .................... P1900255

(51) Int. Cl.
*G06F 21/60*  (2013.01)
*G06F 16/21*  (2019.01)
*H04L 9/08*  (2006.01)

(52) U.S. Cl.
CPC .......... *G06F 21/602* (2013.01); *G06F 16/211* (2019.01); *H04L 9/0861* (2013.01); *H04L 2209/42* (2013.01); *H04L 2209/76* (2013.01)

(58) Field of Classification Search
CPC .... G06F 21/602; G06F 16/211; H04L 9/0861; H04L 2209/42; H04L 2209/76
See application file for complete search history.

(56) References Cited

U.S. PATENT DOCUMENTS

| | | | |
|---|---|---|---|
| 10,304,062 B1 * | 5/2019 | Hines | G06Q 30/018 |
| 2019/0213356 A1 * | 7/2019 | Vágujhelyi | G06F 21/6254 |

FOREIGN PATENT DOCUMENTS

| | | |
|---|---|---|
| EP | 3188070 | 7/2017 |
| WO | 2021009528 | 1/2021 |

OTHER PUBLICATIONS

European Patent Office, International Search Report and International Preliminary Report on Patentabiliy in PCT Application No. PCT/HU2020/050031, dated Jul. 5, 2021 (24 pgs.).

(Continued)

*Primary Examiner* — Abiy Getachew
(74) *Attorney, Agent, or Firm* — Wood Herron & Evans LLP

(57) ABSTRACT

The invention is a cryptographic pseudonym mapping method for an anonymous data sharing system, the method being adapted for generating a pseudonymised database (DB) from data relating to entities and originating from data sources ($DS_i$), wherein the data are identified at the data sources ($DS_i$) by entity identifiers (D) of the respective entities, and wherein the data are identified in the pseudonymised database (DB) by pseudonyms (P) assigned to the respective entity identifiers (D) applying a one-to-one mapping, irrespective of the originating data source. According to the invention, one mapper (M) and one key manager (KM) are applied, and a respective pseudonym (P) is generated by the mapper (M), for each encrypted entity identifier ($C_i$) encrypted by the data source ($DS_i$), utilizing the mapping cryptographic key ($h_i$) corresponding to the particular data base ($DS_i$).

10 Claims, 1 Drawing Sheet

(56) References Cited

OTHER PUBLICATIONS

Patil Shravani Mahesh et al: "RSA-Based Collusion Resistant Quorum Controlled Proxy Re-encryption Scheme for Distributed Secure Communication" Dec. 11, 2018, Advances in Databases and Information Systems; Springer International Publishing, Cham, pp. 349-363, XP047499105, ISBN: 978-3-319-10403-4 [retrieved on Dec. 1, 2018]1 section 2 section 5, http://dx.doi.org/10.1007/978-3-030-05366-6_29.
John M. Delaurentis: "A further Weakness in the Common Modulus Protocol for the RSA Cryptoalgorithm", vol. 8, No. 32, Jul. 1, 1984 (Jul. 1, 1984), pp. 253-259, XP055737288, US, ISSN: 0161-1194, DOI: 10.1080/0161-118491859060, http://dx.doi.org/10.1080/0161-118491859060.
Giusepe Ateniese et al: "Improved Proxy Re-Encryption Schemes with Applications to Secure Distributed Storage," ACR, International Association for Cryptologic Research, vol. 20060111:153421, Jan. 11, 2006 (Jan. 22, 2006), pp. 1-25, XP061001560, DOI: 10.1145/1127345.1127346 [retrieved on 2006-04-211] section 3.1.
Ivan A et al: "Proxy Cryptography Revisited," Proceedings of the Symposium on Network and Distributed Systemsecurity, XX, XX, Feb. 1, 2003 (Feb. 1, 2003), pp. 1-19, XP002237307, section 4.
European Patent Office, International Search Report in PCT Application No. PCT/HU2020/050032, dated Nov. 9, 2020 (3 pgs.).
European Patent Office, International Preliminary Report on Patentabiliy in PCT Application No. PCT/HU2020/050032, dated Jun. 22, 2021 (18 pgs.).

\* cited by examiner

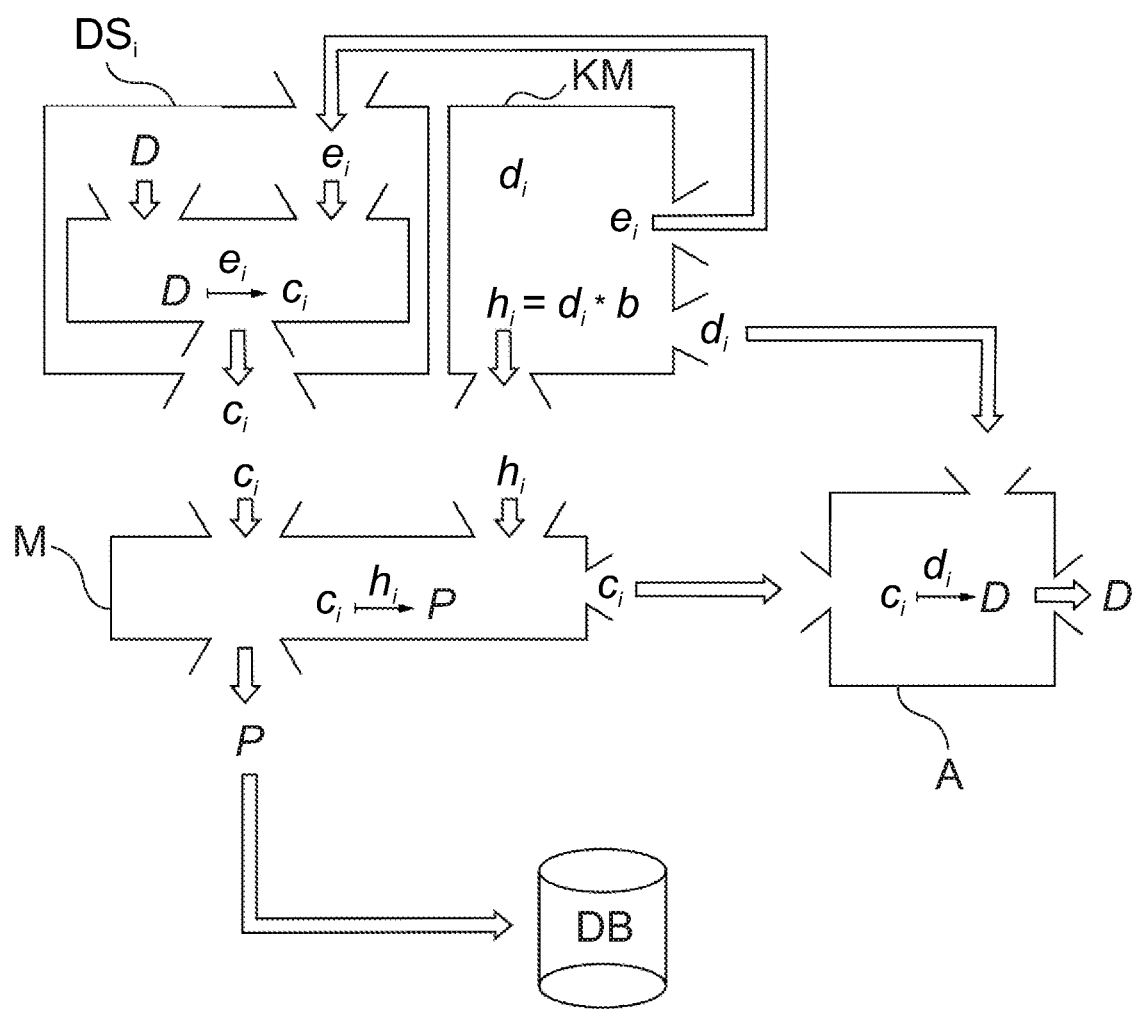

CRYPTOGRAPHIC PSEUDONYM MAPPING METHOD, COMPUTER SYSTEM COMPUTER PROGRAM AND COMPUTER-READABLE MEDIUM

CROSS REFERENCE TO RELATED APPLICATIONS

This application is a continuation of U.S. application Ser. No. 17/627,762, which claims priority, under Section 371, and/or as a continuation under Section 120, to PCT Application No. PCT/HU2020/050032 filed Jul. 14, 2020, which claims priority to Hungarian Application No. P1900255 filed Jul. 15, 2019.

TECHNICAL FIELD

The invention relates to a cryptographic method and computer system for pseudonym mapping, a computer program and a computer-readable medium, preferably for implementing a system for data sharing wherein the data can be analysed in an anonymous manner. The invention provides a secure pseudonymisation solution that complies with the regulations of GDPR.

BACKGROUND ART

Currently applied pseudonymisation methods do not address the special data processing needs of authorities. Article 2 of GDPR stipulates that the regulation does not apply to the processing of personal data if the competent authorities process the data for the purposes of the prevention, investigation, detection or prosecution of criminal offences or the execution of criminal penalties, including the safeguarding against and the prevention of threats to public security. However, the competent authorities cannot make use of this option if they are not able to assign the pseudonyms to natural persons even if such assigning is allowed by the regulations. In the currently widely applied pseudonymisation solutions the same mapping is performed by the data sources, which ensures that the same pseudonym corresponds to a particular identifier in all cases, but allows any party to crack the encryption by mounting, for example, a rainbow table-based attack. The present invention provides a solution for the problem of providing the option, exclusively for a competent authority, to assign data that have been pseudonymised for analytic purposes, anonymised by other appropriate means, and are not utilised for official purposes, to unencrypted data utilising a specially handled cryptographic key that was generated for this purpose.

WO 2017/141065 A1 entitled "Data management method and registration method for an anonymous data sharing system, as well as data manager and anonymous data sharing system" discloses a solution for analysing data residing with multiple mutually independent entities—hereinafter, data sources—in a way that the data are loaded in a single unified database in which the identifiers of the entities (for example, persons, companies) are stored applying pseudonyms adapted for protecting anonymity, ensuring that the original data cannot be restored from the pseudonyms. The present invention complements the solution disclosed in WO 2017/141065 A1 with a pseudonym mapping method that is secure from a number-theoretical aspect. However, security risks for the process of assigning the pseudonyms to the original identifiers are posed not only by the vulnerability to number-theoretical attacks of the pseudonym mapping algorithm. In WO 2017/141065 A1 a detailed description of measures that have to be taken, in addition to providing the pseudonym mapping method in order to secure the anonymity of the database containing the pseudonyms is provided. These are, among others, the prohibition of assigning attributes to data, the analysis of k-anonymity and I-diversity, or the prevention of node identification based on the morphological properties of the graph reflecting the interrelations of entities. All the methods described in the referenced document can also be applied in the present invention, including the case wherein ensuring the anonymity of the data sources is also a requirement. This is especially important in the case when the data sources report data related to themselves.

Nowadays, almost all real-world events leave traces in the form of data stored in the digital space. The analysis of these data allows for making valuable inferences. The data are stored at a plurality of entities that are usually not in a dependent relationship with one another. The data are often characteristic of entities (for example, persons, companies, institutions, properties, apparatuses, financial assets, etc.) or describe the behaviour thereof. In the databases, the entities are referred to applying widely known entity identifiers (for example, social security number, tax number, land registry number). The analysable data that are characteristic of the entities according to the entity identifiers are called attributes.

An analysis that better approximates reality can be carried out concerning the behaviour and the interrelations of the entities in case the widest possible scope of data can be utilized for the analysis. The best way to do that would be to analyse all the available data applying a single database. However, the databases often contain confidential information, or—for example in the case of natural persons—legally protected information. This sets limits for data managers in sharing the data managed by them for aggregated analytical purposes. Because of that, the data managers, i.e. the data sources have to pass on the data such that the entities performing the pseudonymisation mapping and the analysis applying the common database are not able to access the original entity identifier. This is feasible because, in most cases, the aim of the analysis is not understanding the properties, behaviour or contact network of a particular person or thing, but recognising patterns of behaviour that can be expected from (anonymous) individuals in a larger population, analysing the structure of contact networks, and making inferences related to the future course of events.

The requirements set for the mapping between the unencrypted, open entity identifier and the anonymous identifier (hereinafter: pseudonym) stored in the common database, are defined by the method disclosed in WO 2017/141065 A1. This mapping can be practically implemented only by utilizing a special information-technology device, namely, a cryptoprocessor (a dedicated computer unit that performs cryptographic operations under physically protection). In open multi-user systems this poses problems for the applicability of the system. In contrast to the mappings carried out in a single step, the known technical solution usually provides protection against "brute force"-type attacks (by possessing information on the operation of the encryption system, the applied key is determined by trying each possible key), but malicious cooperation between a data source and the entity performing the mapping can be prevented only by applying a complementary method, for example by encrypting the mapped values by an additional entity.

The pseudonym can be applied for the purposes of the above described analysis if a given open entity identifier is entered into the common database under the same pseudonym, irrespective of which data source sent it, i.e. the mapping between the unencrypted identifiers and the pseudonyms has to be a one-to-one mapping, where the inverse of the mapping cannot be computed, i.e. the unencrypted entity identifier cannot be generated from the pseudonym, by any entity. If the mapping is carried out by the data sources, then they also have to apply the same mapping. If an algorithmically non-reversible mapping is required, then a cryptographic hash function is usually applied, with the unencrypted data being the input of the function, and the output value being in the case the pseudonym. What poses a problem is that the multiplicity of the entity identifiers is usually low, on the order of between a hundred million and a few tens of billions. For such a manifold, a rainbow table (a pre-computed table for inverting cryptographic hash functions) can be generated in a very short time. Therefore, in the course of computing the hash value, the input data are complemented with "salt" (randomly chosen data applied as additional input data of hash functions). In such a case, all entities have to apply the same "salt" so that the one-to-one relationship can be maintained. However, data that are used by all of the data sources can hardly be regarded a secret, or, to perform the calculations it is not even necessary to know the value if the attacker can access the system of any of the data sources (for example, the attacker can be one of the data sources that is not restricted in any way in performing an arbitrary number of mappings).

Another possibility is to entrust the generation of the relation between the unencrypted data or the data encrypted by the data sources applying the same encryption and the pseudonym to a trusted cooperator. The trusted cooperator is able to compile the rainbow table—trivially in the first case, and in the second case, by gaining access to only a single data source's system. Therefore, the solution according to WO 2017/141065 A1 came to the conclusion that the data sources have to apply an encryption method based on a unique, for example, an own, cryptographic key. In such a case, the same entity identifier is sent by the data sources as different ciphers (encrypted data), while pseudonym mapping has to be performed such that the different ciphers have to be assigned to the same pseudonym if the particular ciphers were computed from the same unencrypted identifier. In the solution implemented according to the document, RSA keys are applied, wherein the decryption key is stored in a Trusted Platform Module (TPM, see for example ISO/IEC 11889), the decryption process and the mapping of the unencrypted data into the pseudonym is carried out utilizing a secure cryptoprocessor. This architecture is difficult to implement and requires significant initial investment, while its operation is also cumbersome because the required hardware infrastructure scales linearly with the number of data sources.

EP 3 188 070 A1 discloses a double encryption method, while proxy cryptography is disclosed in Giuseppe Ateniese et al, "Improved Proxy Re-Encryption Schemes with Applications to Secure Distributed Storage", IACR, International Association For Cryptologic Research, Vol. 20060111: 153421, 11 Jan. 2006 (2006-01-11), page 1-25, and in Ivan A. et al, "Proxy Cryptography Revisited", Proceedings of the Symposium on Network and Distributed System Security, 1 Feb. 2003 (2003-02-01), page 1-19.

DESCRIPTION OF THE INVENTION

The object of the invention is to eliminate, or to reduce the impact of, the drawbacks of prior art technical solutions, especially the prior art solution presented above.

The primary object of the invention is to provide a cryptographic pseudonym mapping solution that does not require—for performing decryption and for mapping the unencrypted data to the pseudonym—the use of secure hardware, for example a cryptoprocessor.

The objects of the invention have been fulfilled by providing the cryptographic pseudonym mapping method according to claim 1, the computer system according to claim 7, the computer program according to claim 9, and the computer-readable medium according to claim 10. Preferred embodiments of the invention are defined in the dependent claims.

The cryptographic pseudonym mapping method according to the invention is adapted for generating a pseudonymised database from entity data, wherein the data are identified at the data sources utilizing the entity identifiers of the respective entities, and wherein the data are identified in the pseudonymised database utilizing pseudonyms assigned to the respective entity identifiers applying a one-to-one mapping.

The present invention is a solution that utilizes the properties of modular exponentiation performed on residue classes, and the properties of operations based on specially selected discrete points of elliptic curves, and implements the required abstract mapping, while not containing the above-mentioned limitations related to the prior art.

In contrast to the prior art, the invention does not require any special hardware for storing the cryptographic keys or for performing calculations, but instead solves the problem by purely cryptographic means. This requires first of all that the entity identifiers have to be assigned to elements of the algebraic (mathematical) structure (see for example in Wikipedia) on which the cryptographic calculations are performed. Information technology devices apply a binary representation of data, so data can be interpreted as positive integers that can be utilized for performing calculations. In the following, it is assumed of the domain of the mappings that it is capable of providing a unique representation of the entity identifiers and the computed ciphers. For example, if the computations are performed on a cyclic group (see for example in Wikipedia) of residue classes, then the modulus is chosen to be large enough that a sufficient number of residue classes are available. Due to the key sizes applied in practical implementations, this does not pose a problem. In the case of modular exponentiation performed on residue classes, for example, the exponent can be represented applying much more bits compared to practically occurring entity identifiers. In such cases, the so-called "padding" of the values can be considered, such that the exponentiation performed with a low base cannot be inverted by ordinary root computation. This occurs in case modular arithmetic is not required during the process of computing the result. Due to the requirement of applying a one-to-one mapping only deterministic padding methods can be applied.

Therefore, a plurality of data sources is considered, each data source comprising a database containing entity identifiers and attributes. The data have to be collected in a common database such that the entity identifiers are included therein applying pseudonyms according to the following:

(1) A given entity identifier has to be mapped to the same pseudonym, irrespective of the data source it was received from.
(2) The same pseudonym must never be assigned to two different entity identifiers.
(3) The relationship between an unencrypted identifier and its pseudonym must not be obtainable by any participant of the system utilizing only the information known by it, even if a data source cooperates with a participating entity taking part in the mapping with the intention of breaking the encryption.

(4) A specially authorised entity (for example a competent authority) has to be able to compute the unencrypted entity identifier from the ciphers sent by the data sources.

Conditions (1) and (2) together imply that the mapping has to be a one-to-one mapping. Cryptographic mappings meet this requirement, provided we remain inside the domain (in cryptography, the message domain) thereof. Condition (3) excludes all such mappings that can be performed by only one or two participating entities, without cooperating with others. To fulfil condition (4) such a method is required that is adapted to generate unencrypted data from the ciphers mapped applying cryptographic keys utilised by the other entities, while the other entities are not able to compute this decryption key from their respective own cryptographic keys. Because the relationship between the pseudonym and the unencrypted data is to be protected by all means, it is the cipher computed by the data sources that has to be applied for fulfilling this condition. It must not be possible for the data source to track the first and second step of the mapping, because otherwise it can trivially obtain the pseudonym as the result of the second computation step. The entity carrying out the second mapping can trivially access the pseudonym, so it must not access the unencrypted entity identifier. This can be provided if the entity identifiers are sent by the data sources to the mapper entity applying their own unique encryption, i.e. utilizing their own cryptographic key, but the data sources either cannot "see" the pseudonym mapping computation or they cannot relate the result thereof to the data provided by themselves.

According to the technical solution described in WO 2017/141065 A1, pseudonym mapping has to be performed applying the cipher by breaking down the mapping into steps wherein a given step can be performed only by a single participating entity adapted to perform the mapping:

$$P = g_b(f_{key_i}^{-1}(C_i)) = f_b(f_{key_i}^{-1}(f_{key_i}(D)))$$

where D is the entity identifier, P is the pseudonym, i is the numeric identifier of the data source, and $C_i$ is the cipher computed applying its own key. The different mappings in an encryption system usually execute the same algorithm applying different keys. Therefore, the mapping g performed applying the key b can be replaced by $f_b$. Applying a single mapper, for example a secure cryptoprocessor, the mapper is adapted for decrypting the cipher, following by mapping the unencrypted data to the pseudonym P applying the pseudonym mapping key b. For example, applying the RSA method (see for example in U.S. Pat. No. 4,405,829 A) the cryptographic key of the i-th data source is ($e_i$, N), where e is the encryption exponent and N is the modulus. The cipher is obtained by the calculation $$C_i \equiv D^{e_i} \bmod N$$

It is then sent to the entity performing pseudonym mapping that generates unencrypted data utilizing the decryption key ($d_i$, N), where di is the exponent, performing the calculation $$D \equiv C_i^{d_i} \bmod N$$

According to U.S. Pat. No. 4,405,829 A this calculation is performed for example applying a secure cryptoprocessor such that the mapper cannot access the unencrypted data but can use the results for computing the pseudonym. The pseudonym is obtained from the unencrypted data utilizing the cryptographic key (b, N) of the mapping $g \equiv f_b$ (here, unlike elsewhere in this description, the ≡ sign denotes identity rather than congruence):

$$P \equiv D^b \bmod N$$

It is important that the values di and b cannot be read out from the device performing the computation; such a device is for example the Trusted Platform Module chip. Because both g and f represent modular exponentiation modulo N, hereinafter only f is used. Using the notation of the above example, the entire mapping is $$P \equiv ((D^{e_i} \bmod N)^{d_i} \bmod N)^b \bmod N$$

where the innermost cipher computation utilizing the exponent $e_i$ is performed by the data source, followed by the mapper performing the computation applying the exponent b.

An object is to present a computation method for performing the latter two mappings in the course of which the entity performing the computation
  i. is not able to access the entity identifier D, i.e. the unencrypted data, and
  ii. is not able to access the exponent b that is applied for generating a pseudonym from the unencrypted data.

It follows from condition (i.) that the entity performing the computation must also not be able to access di because otherwise it could decrypt the cipher. Condition (ii.) is required in order to prevent a successful trial-and-error or rainbow-table based attack by the mapper. In the exemplary mappings, data are represented applying residue classes defined by a positive integer modulus (N).

In the solution according to the invention, decryption applying an inverse key and pseudonym mapping can be performed in an arbitrary number of steps such that unencrypted data (an entity identifier) is not generated in the course of the computations, no entity is able to obtain the decryption key $key_i^{-1}$, and also no entity is able to obtain the pseudonym mapping key b, i.e. no entity is able to generate a pseudonym from unencrypted data in secret, i.e. to compile a rainbow table. To provide for that, information technology methods based on known number theoretical bases are applied.

BRIEF DESCRIPTION OF THE DRAWINGS

Preferred embodiments of the invention are described hereinafter by way of example with reference to the following diagram, where FIG. 1 is the schematic diagram illustrating a solution according to the invention that is implemented applying a single key manager and comprises a specially authorised entity that is adapted for deciphering the encrypted data (cipher) of the data source.

MODES FOR CARRYING OUT THE INVENTION

According to the invention it has been recognised that the characteristics of algebraic structures constituting multiplicative or additive cyclic groups can be preferably utilized to fulfil the objects of the invention. Two types of solutions based on such algebraic structures are described below in more detail, but, according to the invention, other such algebraic structures that provide the arithmetic required for the operation of the invention can also be applied. Of the exemplary algebraic structures, a solution involving residue classes modulo N (where N is a positive integer) is first described in detail, followed by describing, in relation to the former, a solution involving points of elliptic curves defined over the number field of residue classes modulo p (where p is a prime).

The entity identifiers and corresponding data are stored in databases at mutually independent data sources, and, after pseudonymisation according to the invention, the data, together with the pseudonyms generated from the entity identifiers, are stored, assigned to each other, in a central pseudonymised database. Complying with the conditions of the object set for the invention, for a given entity identifier, the relationship between unencrypted data and the pseudonym cannot be affected by the origin of the data (i.e. what data source it came from). However, the process of mappings, i.e. the operations performed at the particular stages, are unique for each data source, that is, different cryptographic keys (for example, modular exponents) have to be used for performing the same mapping. The implementation of a data gathering system necessarily begins with selecting an appropriate modulus. This is carried out in practice by the provider of the data gathering service, or the data gathering community first deciding upon the bit length of the applicable keys. Then, two such prime numbers are selected of which the product (applied as the modulus) can be represented using the given number of bits. The entity generating the keys (hereinafter: the key manager) has to know the modulus N and also the value $\varphi(N)$ given by the Euler function, or in other words, its totient value. The value N of the modulus has to be known by all participating entities performing mappings. If the representation size of the entity identifiers to be mapped is significantly smaller than the key size, some kind of padding method is preferably applied. This method has to be deterministic in the sense that every data source has to receive the same value such that the pseudonym is also deterministic, irrespective of the data source. The basic data of the mapping are therefore N and $\varphi(N)$.

According to the invention, by random selection it is meant that the implementation of the method is not dependent on which particular elements of the given set are chosen. Accordingly, random selection is meant to include also quasi-random or pseudo-random selection, as well as all such selection methods (even according to rules unknown to an observer) wherein the selection appears to be random to the outside observer. If the set constitutes an algebraic structure, then, if it has a null element and/or a unit element, then it/they are not regarded as randomly selected. Also, in the case of residue classes, the selection of non-relatively prime values is avoided. However, for cryptography considerations it is worth selecting such values for which the bit length of their representation fills up all the available space.

As can be seen in FIG. 1 entity identifiers D and attributes (the latter are not shown in the diagram) describing the entities or their behaviour are stored by data sources $DS_i$ in their respective own databases. The relationship between a particular entity and the other entities can be regarded as a characteristics of the given entity. Thus, in such a relation the entity identifiers of the other entities are regarded as attributes (for example, B is a client of A, in which case B is an attribute and an entity identifier at the same time). Because the aim of the technical solution according to the invention is supporting anonymity, such data can also be regarded as an entity identifier.

The attributes related to the entity identifiers D are preferably passed on by the data sources $DS_i$ as unencrypted data, while the entity identifiers D are encrypted by the data sources $DS_i$ utilizing their own cryptographic keys. The resulting cipher is sent to the entity adapted to perform the mapping to the pseudonym P, i.e. to the mapper M. At the same time, an assignment between the unencrypted data and the cipher, i.e. the encrypted entity identifier is maintained, because the database required for data analysis can only be loaded with useful information in such a manner.

The inventive technical solution applying a single mapper M common for all data sources $DS_i$ is implemented as follows. In a first step, encryption is performed by the data source $DS_i$, followed by the pseudonym P being computed by the mapper M in a second step. If these two entities cooperate, then they are able to connect the unencrypted data with the pseudonym P, so they can even generate a rainbow table. The solution can be applied therefore in case supervision of the mapper M is complemented by further informational technology means.

The i-th data source $DS_i$ uses its own secret cryptographic key that is referred to as ($e_i$, N) using the references applied above. Each data source may utilize an arbitrary number of keys, so more than one key identifier index i can correspond to it. Therefore, the entity identifier D is sent to the mapper as the cipher $$C_i \equiv D^{e_i} \bmod N$$

As it was shown above, the pseudonym is generated by the mapper performing the operation $$P \equiv ((C_i)^{d_i} \bmod N)^b \bmod N$$

As a result of the intermediate calculations, by computing the value $(C_i)^{d_i} \bmod N$, the unencrypted value D can be obtained that has to be kept hidden from the mapper. For the same reason, it must also not have access to $d_i$. The solution for this problem is performing the two exponentiation operations utilizing the exponents $d_i$ and b simultaneously, applying the exponent $h_i \equiv d_i \cdot b \bmod \varphi(N)$:

$$P \equiv C_i^{h_i} \bmod N$$

It has to be noted that the result of the operations performed on the exponents of modular exponentiation has to be computed with a modulus according to $\varphi(N)$, because these exponents form a cyclic group having a number $\varphi(N)$ of elements.

Of course, it has to be made sure whether the entity identifier D, i.e. the unencrypted data appears somewhere in the course of the above calculation. If the modular exponentiation above was performed as a sequence of multiplications, then after performing $d_i$ multiplications the unencrypted identifier D would be obtained, which would make the method useless because the entity performing the computation can easily check if the obtained partial result is of the form expected from the entity identifier, especially if it also contains a CDV (check digit value). However, due to the minimally applicable key size of 2048 bits, the decimal form of the exponent has 616 digits, i.e. as many as $10^{616}$ modular multiplications would have to be carried out. In practice, this is not feasible. Therefore, the simplest (but by far not the most effective) practically feasible method will be described below. The exponentiation $x^y$ is performed applying a binary exponentiation method (see for example: modular exponentiation, right-to-left binary method). The numbers are represented in binary form, as a sum of powers of two. For example, for y:

$$y = y_0 \cdot 2^0 + y_1 \cdot 2^1 + y_1 \cdot 2^2 + y_3 \cdot 2^3 + y_{n-1} \cdot 2^{n-1}$$

where $y_i$ is the i-th bit of the binary representation of the number, i.e. it is either zero or one, contributing either zero or $2^i$ to the sum. Thus $$x^y = x^{y_0 \cdot 2^0 + y_1 \cdot 2^1 + y_2 \cdot 2^2 + y_3 \cdot 2^3 + \ldots} = x^{y_0 \cdot 2^0} \cdot x^{y_1 \cdot 2^1} \cdot x^{y_2 \cdot 2^2} \cdot x^{y_3 \cdot 2^3} \cdot \ldots \cdot x^{y_{n-1} \cdot 2^{n-1}}.$$

Therefore, if the i-th bit of the exponent y is zero, then the intermediate result is multiplied by one, while if the i-th bit is one, then it is multiplied by $x^{2^i}$, i.e. by $x^1$, $x^2$, $x^4$, $x^8$, ..., $x^{2^{n-1}}$. However, in the case of binary representation, exponentiation applying powers of two can be carried out as a bitwise shift operation. Thereby, practical computability has been achieved. The intermediate result is the product of the powers computed applying exponents of (the corresponding) powers of two of the non-zero digits of the binary representation of the cipher $C_i$. This would be equal to D if the first r (low-order) bits of $h_i \equiv d_i \cdot b \mod \varphi(N)$ were identical with the bits of $d_i$, where the lower-order bits are located towards the left. If the length of $d_i$ is the same as the length of $h_i$, i.e. they start with the same number of zeroes, then multiplication by b corresponds to a multiplication by unity, i.e. $b \equiv 1 \mod \varphi(N)$. Let us exclude this trivial case wherein the pseudonym mapping would be identity, so accordingly b is not chosen to be one. Otherwise, key selection (and therefore also the selection of inverses) can be considered random, so the chance that they start with a number n of zeroes is $2^{-n}$.

Let us consider the case where $d_i$ and $h_i$ do not have the same length. If the multiplication $d_i \cdot b$ is performed according to the "long multiplication" algorithm (like on paper), utilizing the digits of the multiplier $d_i$ for multiplying the multiplicand b considered as unknown, then where a given bit of $d_i$ is one, the result is b, while where the given bit is zero, the result is zero. The value of the given bit can practically be considered random, so statistically the intermediate result will be non-zero in half of the cases. The intermediate results are then shifted according to the corresponding digit of the multiplier and are added up. As a result, as many equations as the number of non-zero bits in $d_i$ are obtained, the number being on average half the length of $d_i$. In all of these equations it is stated that the sum of particular bits of b equals the value of the corresponding digit of $d_i$, i.e. zero or one. With a key size of 2048 bits, the solution has to satisfy, on average, 1024 statements. On the right side of the equations a value of one or zero can stand, which is obtained exclusively as a sum of zeroes and ones. If, for a randomly chosen b value the calculated value is not the same as the zero or one at the just-calculated digit of the product, then changing a single bit of b included in the calculation will yield a correct result. This, however, each time cuts in half the number of the potentially selectable values that are binary representations of b. Therefore, an operation that yields the result of an exponentiation performed applying $d_i$ as the exponent is carried out with a probability of $2^{-1024}$, i.e. the unencrypted data is obtained with a probability of $10^{-308}$. The unencrypted data is therefore practically never generated in the course of the calculations.

The common identifiers of the data gathering network are characterised by the following. In the course of mapping the keys, the modulus N is generated applying the method specified in WO 2017/141065 A1, as the product $N = p \cdot q$ of two prime numbers of appropriate magnitude. In such a case, $\varphi(N) = (p-1) \cdot (q-1)$. The only requirement for the exponent b utilized for mapping the unencrypted data into the pseudonym is that it is relatively prime to $\varphi(N)$. The modular multiplicative inverse of b for $\varphi(N)$ (the multiplicative inverse of a is $a^{-1}$ modulo m if $a^{-1} a \equiv 1 \mod m$) is not computed because it is not used for any calculations.

The process of generating a pair of mapping keys is the following: After carrying out the above calculations, an exponent $d_i$ that is relatively prime to $\varphi(N)$ is chosen randomly. Then the extended Euclidean algorithm is applied for computing $e_i$, for which the formula $e_i d_i \equiv 1 \mod \varphi(N)$ will hold true. After that, $h_i \equiv d_i \cdot b \mod \varphi(N)$ is computed.

Because in possession of b a pseudonym can be generated from the unencrypted data, this data can be made accessible to such entities that cannot access the unencrypted data at all. Therefore, in such systems a key manager KM is required that is adapted for generating the keys and making them accessible to the entities performing the computations. The values of p, q and b are thus generated by the key manager and are kept secret. The value $\varphi(N)$ is accessible also only to the key manager, i.e. it is the only entity that is capable of generating keys ($e_i$, $d_i$ and $h_i$), i.e. the above described pair of mapping keys is generated by the key manager KM.

It may be allowed by legislation or by the rules of the data gathering and data analysing community that an authority A or an authority trusted by the community is given access to the unencrypted data. Because it is not desired that even this entity is capable of making a connection between unencrypted data and the pseudonyms, ciphers originating directly from the data sources $DS_i$ are preferably applied for this purpose. In order to carry out the decryption operation it is required that the key manager KM pass on the key $d_i$ to this entity over an encrypted data channel. Then, provided that it has the required legal authorisation or the permission of the data gathering community, it may request the required cipher data from the mapper M.

This entity is thus capable of accessing the received unencrypted data by performing the calculation $D = C_i^{d_i} \mod N$. If decryption authorisation is to be controlled for each data element, then a respective different cryptographic key has to be utilized by the data source $DS_i$ for encrypting each data element before passing it on to the mapper M. The required keys have to be requested on each occasion from the key manager KM that generates the cryptographic key $e_i$ of the data source $DS_i$ and the mapping key $h_i$ of the mapper M and passes on the former to the data source $DS_i$ and the latter to the mapper M such that no other entity can access them. The keys $d_i$ and the data are obtained by the authority A for example from the key manager KM and from the entity responsible for managing the pseudonymised database DB, respectively. Thereby, only those ciphers and exclusively those cryptographic keys are passed on to it that correspond to the data included in its authorisation.

An exemplary solution that can be seen in FIG. 1 comprises the following steps:
(1) the constants of the mapping are generated by the key manager KM: $N = p \cdot q$, $\varphi(N) = (p-1) \cdot (q-1)$ (both factors are randomly selected prime numbers that can preferably be represented in half the bit length of the chosen key size), b is the exponent, of which values only N is made public to the other entities, the others are kept secret;
(2) upon a request by a data source $DS_i$ the key manager KM generates, with the identifier i, the pair of keys consisting of the encryption key and the mapping key: the exponents are $e_i$, $h_i$, with the identifier according to the description above, of which the former is passed on to the data source $DS_i$ and the latter to the mapper M together with the identifier index; the data have to be treated as secret data, so data transfer can be performed in an encrypted or other suitable manner.

(3) the entity identifier D, i.e. the unencrypted data is mapped by the data source $DS_i$ into the cipher $C_i \equiv D^{e_i} \bmod N$ and is sent to the mapper M;

(4) the pseudonym is calculated by the mapper M from the cipher: $P \equiv C_i^{h_i} \bmod N$.

(5) Having a proper authorisation, the competent authority A is able to obtain the unencrypted data from the cipher (provided that it receives the exponent $d_i$ from the key manager KM and the corresponding cipher $C_i$ from the data manager) with the following formula: $D = C_i^{d_i} \bmod N$.

In the above described embodiment, the data are encrypted by the data sources $DS_i$ applying respective own secret cryptographic keys $e_i$ identified by the index i, where a data source $DS_i$ can have an arbitrary number of keys.

It is particularly preferable to choose prime numbers as the values p and q, because in that case the number of relative primes is known (it is $(p-1)\cdot(q-1)$).

As it was mentioned in the introduction, pseudonym mapping can also be performed applying points of elliptic curves (see for example the Wikipedia article "Elliptic curve") defined over the number field of residue classes modulo p (where p is a prime). In this context, let the algebraic structure be the set of points satisfying the equation $y^2 = x^3 + Ax + B \bmod p$, where x, y, A and B are the residue classes of the prime number p. First, the unencrypted entity identifier m has to be assigned to a point of the curve. Let us choose a point G of the curve having an order q that is sufficiently great that the points of the message space can be assigned to the points generated by G applying a one-to-one mapping. (For all points of the curve there is a number q being the number of additions to itself of the point required for reaching the point O at infinity. The smallest of such numbers q gives the order of the point.) To achieve that, for example the following method can be applied (Aritro Sengupta, Utpal Kumar Ray: Message mapping and reverse mapping in elliptic curve cryptosystem (2016)). At the low order digits the binary representation of D is complemented by 8 bits. In the above defined formula of the curve, x is substituted with the value thus obtained. If no solution exists for y, then the value of x is increased by one. If a solution does exist, then a point M of the finite algebraic structure defined by the curve has been obtained. The description related to the specification of the objects above is applied here such that this point is projected by the i-th data source $DS_i$ to another point $C_i$ of the curves applying its own cryptographic key, followed by it being projected by the mappers to the point P utilized as a pseudonym such that the different ciphers $C_i$ are assigned to the same point P if and only if the point M was identical.

Because the solution based on algebraic structures forming an additive cyclic group operates in an analogous manner to the solution based on a multiplicative cyclic group, it is not shown separately. The references shown in the figures can be substituted, where needed, with the corresponding operations and references included in the following description. The values x, y, A, B and p adapted to define the algebraic structure are defined by the key manager KM that also selects the point G with a known order greater than the multiplicity of the message space. It then shares these data with the data sources $DS_i$ and the mapper M. A respective secret key b is then chosen randomly or arbitrarily from the residue classes mod q, selecting values different from zero and one.

For data provision, a number $a_i$ is selected, randomly or arbitrarily, for the i-th data source $DS_i$, from the residue classes mod q by the key manager KM, which number will be utilized (after being received in encrypted form) by the data source $DS_i$ as a cryptographic key $e_i = a_i$. Applying the formula $h_i = a_i + b$, it generates the mapping key corresponding to the data source $DS_i$. The key is then passed on to the mapper M in encrypted form.

After that, the encryption operation is performed by the data source $DS_i$ by adding two points: $C_i = M \oplus a_i G$, where the operator $\oplus$ denotes the addition of two points of the curve, and scalar multiplication denotes repeated addition. The above process carried out on residue classes is modified only in that the below described operation is performed on the points of the curve. The following operation is performed by the mapper M on the data originating from the i-th data source: $P = C_i \oplus (-h_i G)$, where the unary operator "−" denotes the reflection of a curve point over the x axis. The operation $\oplus$ utilizing such values are hereinafter denoted with the operator $\ominus$. Thus, the pseudonym P is obtained through the combination of the two mappings:

$$P = M \oplus a_i G \ominus h_i G = M \oplus a_i G \ominus (a_i + b)G = M \oplus (a_i - a_i B)G = M \oplus (a_i - a_i)G \ominus bG = M \ominus bG$$

Thus, the same entity identifier D is sent by each data source as a different cipher, but finally it is assigned to the same pseudonym P. Optionally, the x coordinate of the point P can also be applied as the pseudonym.

It may be allowed by legislation or by the rules of the data gathering and data analysing community that an authority A or an authority trusted by the community is given access to the unencrypted data. Because it is not desired that even this entity is capable of making a connection between unencrypted data and the pseudonyms, ciphers originating directly from the data sources $DS_i$ are preferably applied for this purpose. In order to carry out the decryption operation it is required that the key manager KM pass on the key as to this entity over an encrypted data channel. The encrypted data and also the pseudonymised data can be stored, and passed on to authorised parties, by the key manager KM. In such a case, provided that it has the required legal authorisation or the permission of the data gathering community, the authority A may request the required cipher data from the mapper M. In possession of these data, the unencrypted data can be obtained by performing the calculation $D = C_i \ominus a_i G$.

Therefore, in order to ensure that possessing any component of the system is not sufficient to allow for deciphering the relationship between the pseudonym P and the entity identifier D, the following data conversion is performed by the pseudonym mapping system according to the invention:

producing from data that are available at data sources $DS_i$ and that are suitable for identifying persons, things or other entities by a characteristic name, i.e. from the entity identifier D, such pseudonymised data, in which the entity identifiers D are replaced by a pseudonym P assigned thereto in a one-to-one manner independent of the cryptographic key $e_i$ utilized by the data source $DS_i$, such that applying an encryption means/module, an element b is chosen randomly or arbitrarily by the key manager KM from an algebraic structure forming a multiplicative or additive cyclic group utilized by the cryptographic algorithm (preferably, here the following functionality is implemented by the encryption means/module: it generates a random number which can be mapped into the key space applying a suitable mapping in order to select from among the elements of the key space with a near-uniform probability, i.e. randomly), and from the same algebraic structure, it selects randomly or arbitrarily for each data source $DS_i$ at least one element $e_i$ or as that it passes on to the data source $DS_i$ in such a manner that it can be accessed only by the particular data source $DS_i$ that will apply it as a cryptographic key, such that the unencrypted data D is mapped into the cipher $C_i$, and depending on the algebraic structure, it computes the multiplicative or additive inverse cryptographic key $d_i$ or a of the cipher, and depending on the algebraic structure, it multiplies it with or adds it to the element b, and it passes on the element $h_i$ thus obtained to the mapper M such that it can only be accessed by the mapper M, which mapper M will then utilize $h_i$ as a cryptographic key for mapping data encrypted by the data source $DS_i$ into a pseudonym P and, optionally, if conditions defined outside the system are fulfilled, it passes on the cryptographic key $d_i$ to the authorised entity (i.e. the authority A), which entity if conditions defined outside the system are fulfilled, receives the ciphers $C_i$ corresponding to the data specified by such conditions from the mapper M of the database DB, such that it can obtain the unencrypted data D.

The computer system for cryptographic pseudonymisation according to the invention comprises data sources $DS_i$ containing data related to entities, the data being identified at the data sources $DS_i$ by the entity identifiers D of the entities, a pseudonymised database DB wherein the data are identified applying respective pseudonyms P assigned, in a one-to-one manner, to each of the entity identifiers D, a mapper M, a key manager KM, and modules implementing the above described functions and/or entities, which modules can be hardware, software, or combined hardware-software modules.

The key manager KM is preferably an apparatus comprising a processor adapted for executing a program and memory adapted for providing data writing, storage, and read-out functions. The program run on the apparatus is adapted to generate the data required for executing the mappings, for example the modular exponent adapted for generating a pseudonym from unencrypted data and the totient value of the modulus. The apparatus is adapted for storing these values such that they cannot be accessed by anybody else, but it can still be capable of performing computations utilizing them. In addition to that, it is also capable of computing modular exponent key pairs applying the above described process, for example the extended Euclidean algorithm, and of passing on the encrypted exponent to the data source over a secure data channel and computing the exponent applied for pseudonym mapping, which latter it can also pass on to the entity performing the mapping over a secure data channel. All these requirements are fulfilled for example by the above-mentioned Trusted Platform Module (TPM) circuits.

The mapper $M_j$ is preferably an apparatus that is adapted for reading any input parameters of modular exponentiation (base, exponent, modulus), as well as executing the operation and making the result available for readout. Such a module can for example be implemented as a general-purpose computer or microcontroller. TPM circuits also fulfil all the above listed requirements.

Another aspect of the invention is a computer program comprising instructions which, when the program is executed by a computer, cause the computer to carry out the steps of the method according to the invention. The invention further relates to a computer-readable medium adapted for storing the above-mentioned computer program.

The invention can be applied for various purposes; one of these being the analysis of loyalty card purchase databases involving multiple stores. Let us assume that a company engaged in business analysis and market research activities prepares an analysis of typical customer behaviour in retail stores, which is then purchased by its clients. The analysis is aimed at defining customer groups based on characteristics like the products purchased, the frequency of purchases, the relationship between type and location of stores, the season of year, and the products purchased, etc.

In order to prepare the analysis, the company needs data. In addition to using publicly available statistical data, such companies often seek to motivate retailer chains and individual stores into cooperating with them. To facilitate that, they for example share part of their research results with the retailers so that they can improve the efficacy of their advertising and improve their selection of products. In many store purchase transactions, none of the characteristics of the customer are known. Although the data included in the receipt can be utilized, the only extra information it provides compared to product sale statistics is that it includes information on products sold during a single purchase transaction and the exact time and date thereof. At the same time, the stores can also offer loyalty card programs. Customers are offered various discounts for taking part in such programs. In the case of such purchases, personal information on the customer and other data thereof relevant for analytic purposes are known. Such data have been passed on (in varying detail) to market research companies by some of the stores (data sources), however, due to a change in legislation related to protecting personal data, this practice will soon end. So, the most important product of the market research company, the "retail market report" has become jeopardized. The regulation on personal data protection makes the above business impossible, although analysing the behaviour of customer groups does not require the possession of concrete personal data of any of the customers.

If those pieces of data that are applicable for personal identification are simply removed from the data passed on by the stores (except for, possibly, sex, age and postcode) then more valuable results can be obtained compared to those based on purchase receipts, but the information related to particular purchases of a given (anonymous) person at a given store is lost, although possessing and processing such information is not legally prohibited. The stores have therefore committed to use a made-up identifier, i.e. a pseudonym for the identification of the purchases of a given customer. This further improves analysability, but this way a customer who made purchases in different stores will be treated as multiple different persons if the mode of pseudonymization is not uniform.

The idea may arise that a mapping implemented utilizing a so-called "salted" cryptographic hash function can be applied to the personal data (such as name, sex, birth date, and postcode), but certain lawyers representing the stores may reject this option because the resulting hash data can be connected, by the entity performing the data analysis, to the personal data simply by registering itself as a store and compiling a rainbow table for example from the electoral register. The invention provides a solution to this problem. The implementation of the solution according to the invention can comprise a server software component that allows that the data sources $DS_i$ receive the cryptographic key generated by the key manager KM over an encrypted data channel after authentication at a web page. A computer implementation of the computations performed by the mapper M can be provided. The key generation and mapping service can be activated a cloud service provider such that its operation cannot be affected (except for starting and stopping it) by any of the entities; this setup can preferably also be audited. The mapping factors corresponding to the cryptographic keys of the stores are passed on by the key manager KM to the mapper M over an encrypted data channel, the mapper M then applying them for computing the pseudonym P.

Thereby, the ciphers generated individually by the different stores are mapped into the same value by the entire computational chain.

Thus, the analyses can be applied for picking out customers who typically make their purchases in a given store but usually buy a particular product somewhere else, or on certain days do their shopping at a different location shortly after store closure. These are valuable pieces of information that can support business decisions. For example, it is preferable to stock another brand of a particular product, or to close an hour later on Fridays.

LIST OF REFERENCE SIGNS

D entity identifier
P pseudonym
$DS_i$ data sources
M mapper
KM key manager
$d_i$ inverse
$e_i$ element applicable as cryptographic key (in a multiplicative algebraic structure)
$a_i$ element applicable as cryptographic key (in an additive algebraic structure)
b secret element
$C_i$ encrypted entity identifier
$h_i$ mapping cryptographic keys
DB database

The invention claimed is:

1. A cryptographic pseudonym mapping method for an anonymous data sharing system, the method being adapted for generating a pseudonymised database (DB) from data relating to entities and originating from data sources ($DS_i$), wherein the data are identified at the data sources ($DS_i$) by entity identifiers (D) of the respective entities, and wherein the data are identified in the pseudonymised database (DB) by pseudonyms (P),
characterised in that
the pseudonyms (P) are assigned to the respective entity identifiers (D) applying a one-to-one mapping, irrespective of the originating data source, by
applying one mapper (M) and one key manager (KM), wherein the key manager (KM) is applied for
selecting a secret element (b) from a predetermined algebraic structure constituting a multiplicative or additive cyclic group,
selecting, for each data source ($DS_i$) an element ($e_i$, $a_i$) to be applied as a cryptographic key by the given data source ($DS_i$), from the algebraic structure and sending it to the given data source ($DS_i$) while the element ($e_i$, $a_i$) is kept secret,
calculating an inverse ($d_i$) of the element ($e_i$, $a_i$) in the given algebraic structure, and using it, together with the secret element (b), for generating a mapping cryptographic key ($h_i$) of the mapper (M), the mapping cryptographic key ($h_i$) corresponding to the given data source ($DS_i$), and sending the mapping cryptographic key ($h_i$) to the mapper (M) while keeping it secret and assigned to the given data source ($DS_i$),
transforming by the data source ($DS_i$), each entity identifier (D) to be mapped, into a respective encrypted entity identifier ($C_i$) by using the element ($e_i$, $a_i$) to be applied as a cryptographic key, and
a respective pseudonym (P) is generated by the mapper (M), for each encrypted entity identifier ($C_i$) encrypted by the data source ($DS_i$), utilizing the mapping cryptographic key ($h_i$) corresponding to the particular data source ($DS_i$).

2. The method of claim 1, characterised by applying an algebraic structure constituting a multiplicative cyclic group, wherein values selected by the key manager (KM) are represented by residue classes modulo N, for which algebraic structure constants $N=p \cdot q$, $\varphi(N)=(p-1) \cdot (q-1)$ are predetermined, wherein p and q are randomly selected prime numbers, the secret element (b) is a randomly selected prime number, and $\varphi(N)$ is the value of the Euler function obtained for N,
the element ($e_i$) to be applied as the own cryptographic key of the data source ($DS_i$) is randomly selected by the key manager (KM),
the key manager (KM) is applied for computing the inverse ($d_i$) of the element ($e_i$) to be applied as a cryptographic key, for which the equation $e_i \cdot d_i \equiv 1 \mod \varphi(N)$ is satisfied,
then, the mapping cryptographic key $h_i = d_i \cdot b$ is generated by the key manager (KM), and is sent to the mapper (M),
the encrypted entity identifier ($C_i$) is computed by the data source ($DS_i$) utilizing the formula $C_i = D^{e_i} \mod N$, and the pseudonym (P) $P = C_i^{h_i} \mod N$ is computed by the mapper (M).

3. The method of claim 2, characterised in that the randomly selected prime numbers p and q can be represented utilizing half the number of bits of a chosen key size.

4. The method of claim 2, characterised by sending to an authorised entity (A)
by the key manager (KM), the inverse ($d_i$) of the element ($e_i$) to be applied as a cryptographic key,
by the mapper (M), the encrypted entity identifier ($C_i$).

5. The method of claim 1, characterised by applying an algebraic structure constituting an additive cyclic group, wherein values are represented by points of elliptic curves defined over a number field of residue classes modulo p, where p is a prime number, for which algebraic structure the following constants are predetermined: the parameters A, B of the formula $y^2 = x^3 + Ax + B \mod p$ defining the points of an elliptic curve defined over the residue classes of the prime number p, and a point G of the curve that has an order q that is greater than the number of entity identifiers (D), a secret element (b) having a value chosen arbitrarily from among residue classes mod q,
the key manager (KM) is applied for randomly selecting, from among residue classes mod q, an element ($a_i$) to be applied as a cryptographic key by the data source ($DS_i$), then, a mapping cryptographic key $h_i=a_i+b$ is generated by the key manager (KM), and is sent to the mapper (M), the encrypted entity identifier ($C_i$) is computed by the data source ($DS_i$) utilizing the formula $C_i=M\oplus a_iG$, where operator $\oplus$ is the sum of the points of the elliptic curve, and and the pseudonym (P) $P=C_i \ominus h_iG$ is calculated by the mapper (M), where $A\ominus B=A\oplus(-B)$.

6. The method of claim 5, characterised by passing on to an authorised entity (A)

by the key manager (KM), the inverse ($d_i$) of the element ($a_i$) to be applied as a cryptographic key, and by the mapper (M), the encrypted entity identifier ($C_i$).

7. A computer system for cryptographic pseudonymisation, the system comprising:

data sources ($DS_i$) comprising data by the entity identifiers (D) of the entities, a pseudonymised database (DB), in which the data are identified by pseudonyms (P), characterised in that the pseudonyms (P) are assigned to the respective entity identifiers (D) applying a one-to-one mapping, irrespective of the originating data source, and the system further comprises a mapper (M) and a key manager (KM), a module adapted for selecting, applying the key manager (KM), a secret element (b) from a predetermined algebraic structure constituting a multiplicative or an additive cyclic group, a module adapted for selecting from the algebraic structure, applying the key manager (KM), for each data source ($DS_i$), an element ($e_i$, $a_i$) to be applied as a cryptographic key by the given data source ($DS_i$), and for sending it to the given data source ($DS_i$) while the element ($e_i$, $a_i$) is kept secret, a module adapted for computing, applying the key manager (KM), an inverse ($d_i$) of the element ($e_i$, $a_i$) in the given algebraic structure, for generating, by using said inverse ($d_i$), together with the secret element (b), a mapping cryptographic key ($h_i$) of the mapper (M) corresponding to the given data source ($DS_i$), and for sending said mapping cryptographic key ($h_i$) to the mapper (M) while keeping it secret and assigned to the given data source ($DS_i$), a module adapted for transforming, applying the data source ($DS_i$), each entity identifier (D) to be mapped into a respective encrypted entity identifier ($C_i$) utilizing the element ($e_i$, $a_i$) to be applied as a cryptographic key, and a module adapted for mapping, applying the mapper (M), each encrypted entity identifier ($C_i$) encrypted by the data source ($DS_i$) utilizing the mapping cryptographic key ($h_i$) corresponding to the particular data source ($DS_i$) into a respective pseudonym (P).

8. The computer system of claim 7, characterised in that it comprises modules adapted for performing a cryptographic pseudonym mapping method for an anonymous data sharing system, the method being adapted for generating a pseudonymised database (DB) from data relating to entities and originating from data sources ($DS_i$), wherein the data are identified at the data sources ($DS_i$) by entity identifiers (D) of the respective entities, and wherein the data are identified in the pseudonymised database (DB) by pseudonyms (P), characterised in that the pseudonyms (P) are assigned to the respective entity identifiers (D) applying a one-to-one mapping, irrespective of the originating data source, by applying one mapper (M) and one key manager (KM), wherein the key manager (KM) is applied for selecting a secret element (b) from a predetermined algebraic structure constituting a multiplicative or additive cyclic group, selecting, for each data source ($DS_i$) an element ($e_i$, $a_i$) to be applied as a cryptographic key by the given data source ($DS_i$), from the algebraic structure and sending it to the given data source ($DS_i$) while the element ($e_i$, $a_i$) is kept secret, calculating an inverse ($d_i$) of the element ($e_i$, $a_i$) in the given algebraic structure, and using it, together with the secret element (b), for generating a mapping cryptographic key ($h_i$) of the mapper (M), the mapping cryptographic key ($h_i$) corresponding to the given data source ($DS_i$), and sending the mapping cryptographic key ($h_i$) to the mapper (M) while keeping it secret and assigned to the given data source ($DS_i$), transforming by the data source ($DS_i$), each entity identifier (D) to be mapped, into a respective encrypted entity identifier ($C_i$) by using the element ($e_i$, $a_i$) to be applied as a cryptographic key, and a respective pseudonym (P) is generated by the mapper (M), for each encrypted entity identifier ($C_i$) encrypted by the data source ($DS_i$), utilizing the mapping cryptographic key ($h_i$) corresponding to the particular data source ($DS_i$).

9. A computer program comprising instructions which, when the program is executed by a computer, cause the computer to perform the steps of the method of claim 1.

10. A computer-readable medium storing the computer program of claim 9.

* * * * *